S. A. Kennedy.
Electric Clock.
N° 71624. Patented Dec. 3, 1867.

Negative Pole. Positive Pole.

Witnesses.
Simeon Bocrum.
Saml. Oliver

Inventors.
Samuel A. Kennedy
J. W. Holt
Jos. Gerlach
Stephen Ustick, Atty

S. A. Kennedy.
Electric Clock.
Nº 71624    Patented Dec. 3, 1867.
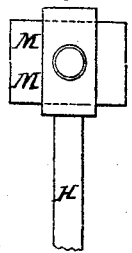
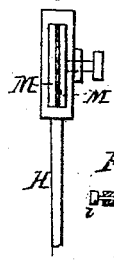
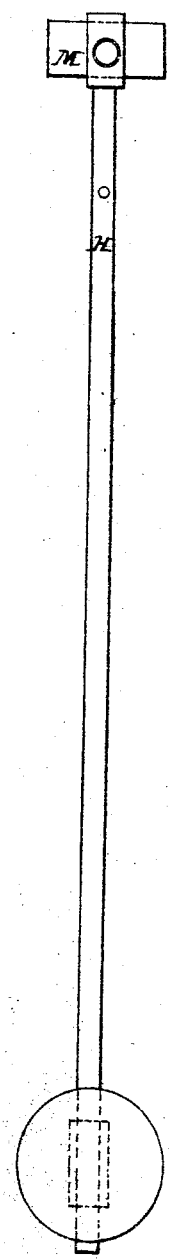
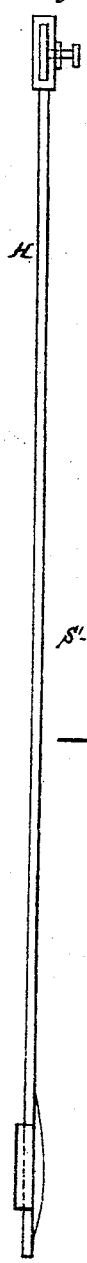
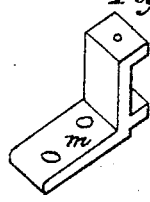
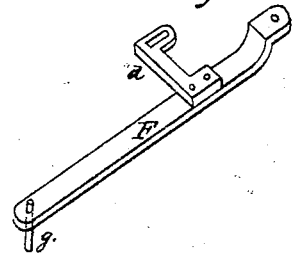
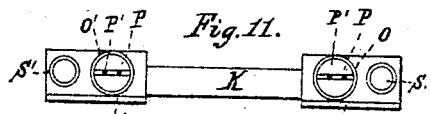
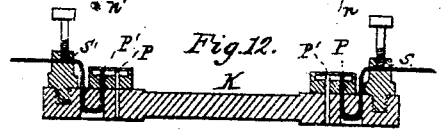
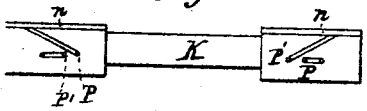
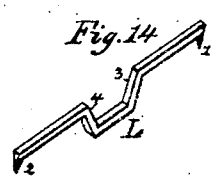
Witnesses.
Simeon Boerum
Saml. Oliver
Inventors.
Samuel A. Kennedy
J. W. Holt
Jos. Gerlach
Stephen Ustick Atty.

UNITED STATES PATENT OFFICE.

S. A. KENNEDY, OF ATTLEBOROUGH, AND S. W. HOLT AND J. GERLACH, OF PHILADELPHIA, PENNSYLVANIA.

IMPROVEMENT IN ELECTRIC CLOCKS.

Specification forming part of Letters Patent No. 71,624, dated December 3, 1867.

*To all whom it may concern:*

Be it known that we, SAMUEL A. KENNEDY, of Attleborough, Bucks county, in the State of Pennsylvania, and S. W. HOLT and JOSEPH GERLACH, of the city and county of Philadelphia, and State of Pennsylvania, have invented a new and useful Improvement in Electric Clocks; and we do hereby declare that the following is a full and exact description thereof, reference being had to the accompanying drawings, and to the letters of reference marked thereon.

The nature of our invention mainly consists in forming and breaking the connection with the positive and negative poles of a battery by means of a vibrating bar operated by the pendulum, and arranged and operating as hereinafter described.

Figure 1:
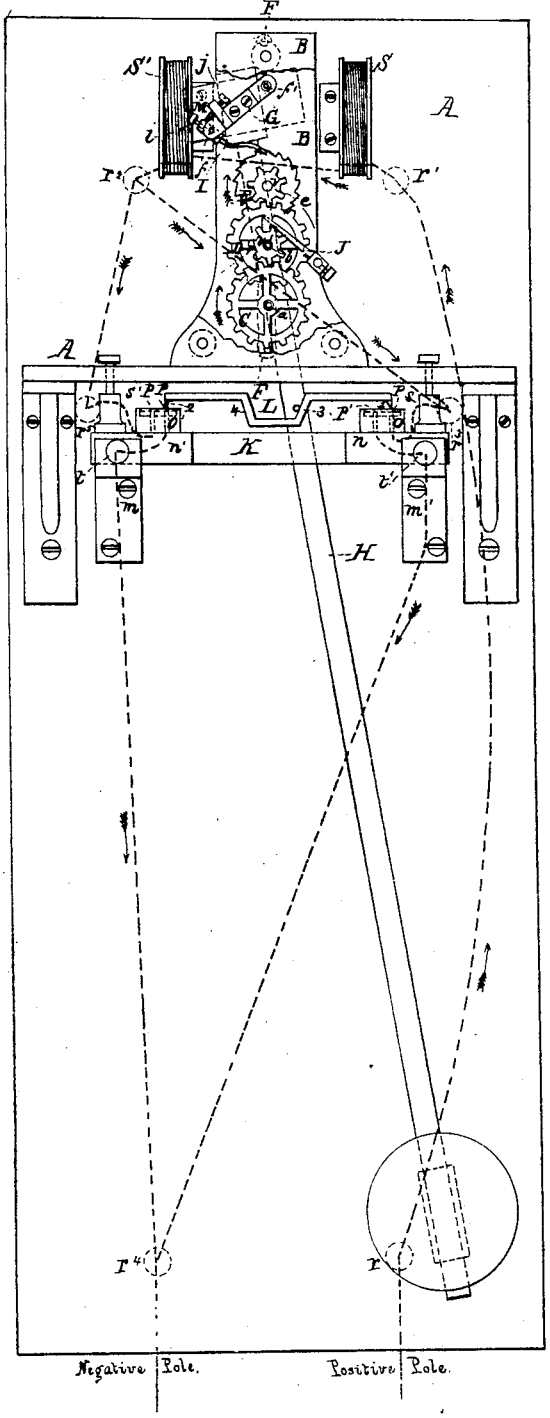
Figure 2:
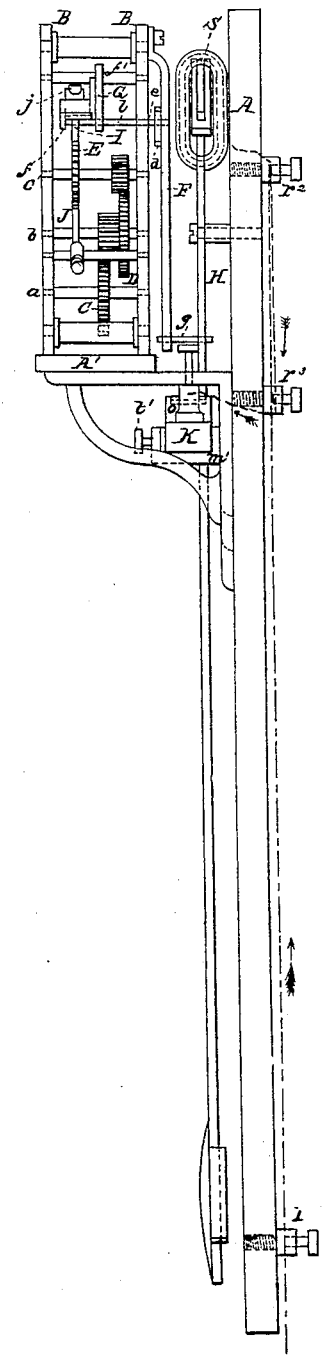

In the accompanying drawings, which make a part of this specification, Figure 1 is a front elevation of the improved clock. Fig. 2 is an edge view of the same. Fig. 3 is a front view of the pendulum H and magnetic bar M in connection. Fig. 4 is an edge view of the same. Fig. 5 is a front view of a modification of the said bar and pendulum. Fig. 6 is an edge view of the same. Fig. 7 is a vertical section of the pawl I. Fig. 8 is an isometrical view of the forked bar G and parts in connection therewith. Fig. 9 is a like view of the lever F. Fig. 10 is a like view of one of the brackets, $m$. Fig. 11 is a top view of the bridge K. Fig. 12 is a vertical section of the same. Fig. 13 is a bottom view of the said bridge. Fig. 14 is an isometrical view of the bar L.

A is a board to which the several parts of the clock are attached.

A' is a shelf which supports the vertical plates B B that support the journals of the shafts $a\ b\ c$ of the center wheel, C, the second-wheel D, and the ratchet-wheel E.

F is a vertical lever, which is actuated by the pendulum H, for giving an automatic motion to the ratchet-wheel E, there being a slotted arm, $d$, of the lever, which receives the pin $e$ of the forked bar G, in which the pawl I is hung by means of the horizontal rod $f$. The upper end of the said bar G is permanently confined to the rock-shaft $f'$. At each vibration of the pendulum from right to left the pawl is drawn outward from the ratchet-wheel by the pendulum bearing against the pin $g$ of the said lever F, and when the pendulum swings back to the right the weight of the lever and the forked bar forces the pawl forward until the arm $h$ of said bar bears against the edge of the contiguous vertical plate B.

There is a set-screw, $j$, in the lug $k$ of the forked bar G, by which the heel end of the pawl is borne down more or less to give a longer or shorter catch of the pawl to regulate the motion of the ratchet-wheel; and there is a set-screw, $l$, in the heel of the pawl for equalizing the balance of do., so as to prevent its falling too hard upon the ratchet.

J is the click-lever.

K is an adjustable bridge, supported by the brackets $m$ and $m'$. The bridge is provided with plates $n$ and $n'$, that communicate with the magnetic wires, there being insulated projections $o\ o'$, which have wires $p\ p'$ and $p\ p'$ connected with the main-circuit wires.

L is a bar for changing the circuit, it having points 1 2, which communicate alternately at each motion of the pendulum with the wires $p$ and $p'$ in the projections $o$ and $o'$, the pin $q$ of the pendulum bearing alternately against the vertical parts 3 and 4 of the bar, and thus changing the points 1 and 2 with the wires $p\ p'$ and $p\ p'$, so as to change the current.

The points 1 and 2 of the bar L, and the upper ends of the circuit-wires $p\ p'$, in the projections $o\ o'$ of the bridge K, are of gold. The said projections $o$ and $o'$ have grooved facings, as seen in Figs. 11 and 12, to guide the points 1 and 2 of the bar L. The former facing is made of brass and the latter of agate.

The pendulum H is shown in detail, Figs. 3 and 4, Sheet No. 2, the forked bar G and parts attached in Fig. 8, the lever F in Fig. 9, one of the brackets, $m$, in Fig. 10, the bridge K in Figs. 11, 12, and 13, and the sliding bar L in Fig. 14. The arm $h$ and pin $e$ may be an extension of the rod $f$ in the forked bar G, as represented in Fig. 8.

The pendulum H has a magnetized bar, M, which is actuated to produce the vibration of the pendulum by the galvanometers S and S', that are, in the drawings, placed above the center of motion. They may, however, be placed below the center, when desired, as the same result would be produced. We contemplate using four or more galvanometers when we want a powerful current, and also having a plurality of the magnetized bars M in the pendulum H. In Figs. 5 and 6 four are represented, which are insulated on their bearings by means of a thin coating of wax, or otherwise.

The circuit-wire, commencing with the platinum or positive pole of a battery, passes through the button $r$, and thence through the button $r'$ to the galvanometer S, and from that to S', as indicated by the arrows, and through the button $r^2$, and thence through the button $r^3$, and through the stud $s$ on the bridge K; thence through the projection $o$, where it forms the point $p$. The wire passes from thence through the screw $t$, which communicates with the bracket $m$, to which is connected the wire leading to the negative pole of the battery through the button $r^4$. The current is formed when the pendulum is swung to the right, as represented in the drawings; but when it is swung to the left it moves the sliding-bar L so as to bring the points 1 and 2 into connection with the points $p'p'$ of the projections $o$ and $o'$, thus changing the current as it passes from $r^2$ to $r^5$, thence through the stud $s'$, and thence to the point $p'$ in the projection $o'$ on the bridge K, where it communicates with the sliding bar L, at the point 2, and passes through said bar to its point 1, where it communicates with the wire $p$ in the projection $o$; thence to screw $t'$ in the bracket $m'$, communicating with the wire leading to the negative pole of the battery through button $r^4$. When the pendulum comes into the position as it now stands the polarized bar M is in connection with the galvanometer S', and being repelled by the same the motion of the pendulum is changed from right to left, and when it reaches the galvanometer S the sliding bar L closes the circuit with the said galvanometer, and the pendulum is again repelled back to the right, and thus the movement is continuously kept up.

What we claim as new, and desire to secure by Letters Patent, is—

1. The combination and arrangement of two or more galvanometers with one or more polarized steel bars, combined with the pendulum, and arranged either above or below the center of motion, substantially as described, and for the purpose set forth.

2. Producing a double automatic circuit by means of the combination of the pendulum H with the sliding bar L, arranged and operating in relation to the electric wires $p$ and $p'$, which project to the surface of the projections $o$ and $o'$ of the bridge K, substantially as described, and for the purpose specified.

3. The combination and arrangement of the electric wires with the batteries, the galvanometers S and S', the sliding bar or circuit-changer L, and the bridge K, so as to produce a double-acting circuit by means of the motions of the pendulum, substantially as described.

4. The combination of the ratchet-wheel E with the pendulum H, by means of the lever F, forked bar G, and pawl I, arranged and operating in relation to each other substantially as described, and for the purpose specified.

5. The combination of the ratchet-wheel shaft $c$ with the shaft $a$, by means of the wheels C and D, and pinions V and V', substantially as represented.

6. The combination of the set-screw $j$ with the forked bar G and pawl I, substantially as and for the purpose set forth.

In testimony that the above is our invention we have hereunto set our hands and affixed our seals this 29th day of March, 1867.

SAML. A. KENNEDY. [L. S.]
S. W. HOLT. [L. S.]
JOS. GERLACH. [L. S.]

Witnesses:
JOHN WHITE,
STEPHEN USTICK.